US008725522B2

(12) United States Patent
Balko

(10) Patent No.: US 8,725,522 B2
(45) Date of Patent: May 13, 2014

(54) AUTOMATIC IDENTIFICATION OF USER-ALIGNED FRAGMENTS IN BUSINESS PROCESS MODELS

(75) Inventor: Soeren Balko, Weinheim (DE)

(73) Assignee: SAP AG, Walldorf (DE)

( * ) Notice: Subject to any disclaimer, the term of this patent is extended or adjusted under 35 U.S.C. 154(b) by 392 days.

(21) Appl. No.: 13/172,238

(22) Filed: Jun. 29, 2011

(65) Prior Publication Data

US 2013/0006887 A1    Jan. 3, 2013

(51) Int. Cl.
*G06Q 30/02* (2012.01)
*G06Q 10/10* (2012.01)
*G06Q 10/06* (2012.01)
*G06Q 30/06* (2012.01)
*G06Q 10/08* (2012.01)

(52) U.S. Cl.
CPC .................................. *G06Q 10/067* (2013.01)
USPC .......................................... 705/1.1; 705/348

(58) Field of Classification Search
None
See application file for complete search history.

(56) References Cited

U.S. PATENT DOCUMENTS

| 2006/0200476 A1* | 9/2006 | Gottumukkala et al. ...... 707/100 |
| 2007/0179642 A1* | 8/2007 | Detzler et al. .................. 700/83 |
| 2008/0120129 A1* | 5/2008 | Seubert et al. .................... 705/1 |
| 2008/0184231 A1* | 7/2008 | Dreiling ........................ 718/100 |

* cited by examiner

*Primary Examiner* — Jonathan Ouellette
(74) *Attorney, Agent, or Firm* — Fish & Richardson P.C.

(57) ABSTRACT

The present disclosure involves systems, software, and computer implemented methods for providing automatic identification of semantically coherent, user-aligned fragments in business process models. One process includes operations for identifying a hierarchy of process fragments in a business process model associated with a user. At least one process metadata category associated with a role of the user is determined. A score for each process fragment in the hierarchy of process fragments is computed, the score computed based at least in part on a probable level of interest in the at least one process metadata category for the role of the user. At least one process fragment in the hierarchy of process fragments for inclusion in a view of the business process model to be presented to the user, the selection based at least in part on the score computed for the at least one process fragment.

23 Claims, 4 Drawing Sheets

(12) United States Patent

AUTOMATIC IDENTIFICATION OF USER-ALIGNED FRAGMENTS IN BUSINESS PROCESS MODELS

TECHNICAL FIELD

The present disclosure relates to software, computer systems, and computer implemented methods for providing automatic identification of semantically coherent, user-aligned fragments in business process models.

BACKGROUND

Business processes are a means to document, communicate, analyze, govern, automate, monitor, and optimize a business organization's operations. Process models jointly capture business goals, best practices, policies, contractual interfaces to business partners, and detailed instructions for task routing and execution of single process steps. Creating or editing a process model is a collaborative effort, involving multiple people having (1) distinct functional roles (such as IT experts, domain experts, process analysts, etc.) and (2) working at different levels of, or in some instances external to, the organizational hierarchy of the business organization (e.g., business partners, customers, suppliers, shop floor employees, Line-Of-Business (LoB) managers, C-level management, etc.). Users involved in generating or editing the process model may be interested in different details associated with the process model or may understand only certain aspects of the process model.

SUMMARY

The present disclosure describes techniques for providing automatic identification of semantically coherent, user-aligned fragments in business process models. A computer program product is encoded on a tangible storage medium, where the product comprises computer readable instructions for causing one or more processors to perform operations. These operations can include identifying a hierarchy of process fragments in a business process model associated with a user viewing or modifying a process model. At least one process metadata category associated with a role of the user is determined. A score for each process fragment in the hierarchy of process fragments is computed, the score computed based at least in part on a probable level of interest in the at least one process metadata category for the role of the user. At least one process fragment in the hierarchy of process fragments selected for inclusion in a view of the business process model to be presented to the user, the selection based at least in part on the score computed for the at least one process fragment.

These and other embodiments can optionally include one or more of the following features. The hierarchy of process fragments is determined by an automatic process fragment detection algorithm. Computing the score for each process fragment includes computing a weighted average of scores for each process metadata category associated with a particular process fragment. Selecting the at least one process fragment further comprises identifying a root process fragment in the hierarchy of process fragments and selecting the root process fragment for inclusion in the view of the business process model if a score of the root process fragment is greater than average scores of all combinations of process fragments in a sub-tree associated with the root process fragment.

Selecting the at least one process fragment is further based on a history of the user's previous views of the business process model. The at least one process metadata category comprises at least one of conversations, service consumption, event receipts, user roles, lane assignments, process logs, or data flows. The view of the business process model contains a complete representation of all process fragments associated with the business process model. The probable level of interest in the at least one process metadata category for the role of the user is determined based on analysis of statistical data related to previous views of business process models.

While generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
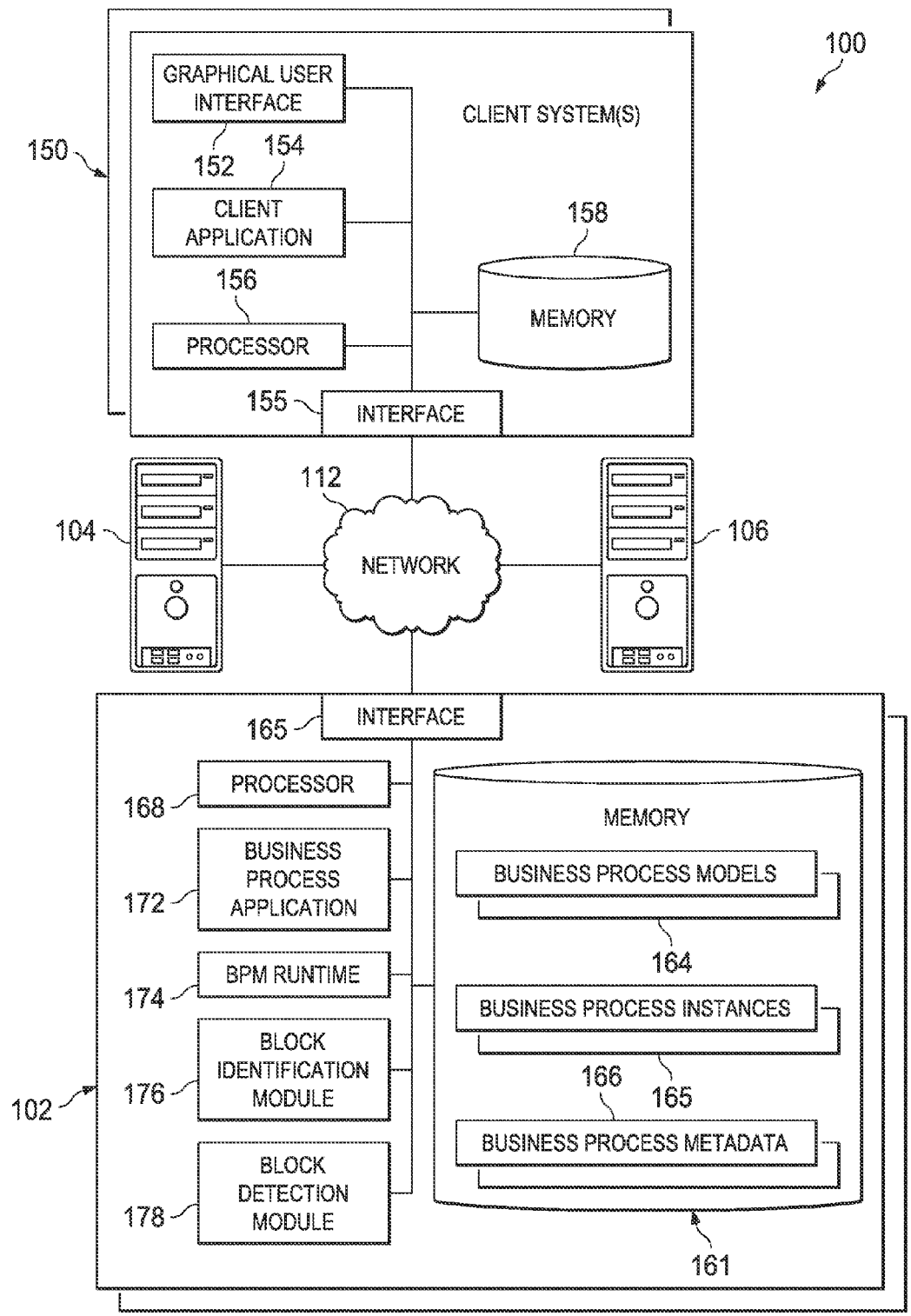
FIG. 1 illustrates an example environment for providing user-aligned business process fragments.

This disclosure generally describes computer systems, software, and computer implemented methods for providing automatic identification of semantically coherent, user-aligned fragments in business process models. Business process management (BPM) can include representing processes of an organization as components, steps, or data flows within a model so that current business processes can be analyzed, automated, optimized, engineered, or extended. In some instances, business process modeling can involve multiple participants or users with different roles and skill sets, with certain users needing different views of the business process model depending on the user's role. In certain implementations, consistent views on a single business process model are derived for different users depending on a user's role. The views can be aligned to the functional role and organizational hierarchy level of the user that is viewing or contributing to the process model.

Process modeling can be a collaborative effort, involving multiple people with different roles, skill sets, and technical or business knowledge. Users with different roles in a business organization typically have different tasks. Further, the users contribute to and view a particular business process from different perspectives and at different levels of granularity aligned to the user's role. For example, a C-level manager may be mainly interested in global value chains whereas a Line-Of-Business (LoB) manager may be primarily concerned with intra-departmental processes and provider or supplier relationships to processes from other departments or external business partners.

Different levels within an organizational hierarchy, such as, for example, shop floor level users, LoB management, middle management, or C-level management, each have different views on business processes. A particular view on a business process can have various degrees of detail or contain details with different subject matter. Examples of the differing levels of detail for a particular view on a business process can include task level, department level, cross-departmental level (e.g., a value chain), or network orchestration level (e.g., in connection with business partners) views. Further, within a hierarchical level, there can be different functional units, each with different roles or professions, such as IT experts, business process experts and analysts, business professionals, and the like. In other words, different users may require different views of a business process model, depending on the user's role.

Despite the different views on a processing model as a result of the different users, business processes are expected to be aligned with the business goals of an organization. Modeling contributors working with different views on business processes may need to avoid inconsistencies, contradictions, or incompatible processes as a result of changes performed from these contributors. For consistency, users from across different levels and functional units should work on a single underlying process model to avoid contradictory process models with incompatible information. Accordingly, different participants in process modeling may require views aligned to their functional role or profession as well as to their organizational hierarchy level corresponding to different granularities and fragments of the process model.

Figure 2:
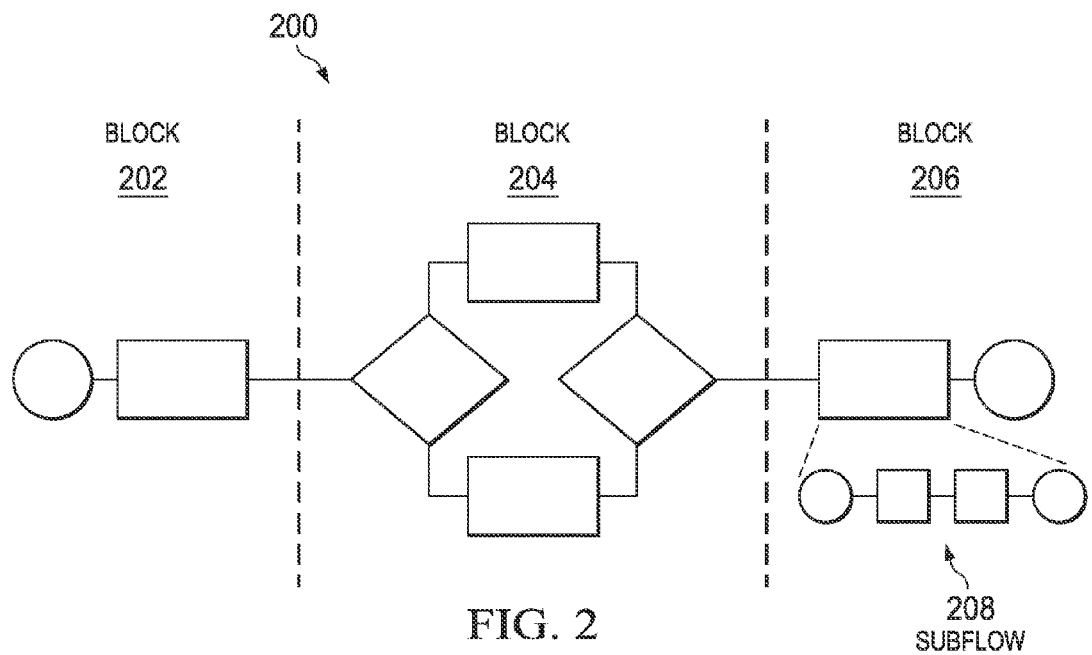
FIG. 2 illustrates a diagram of an example business process, denoting different process fragments using an appropriate system, such as the system described in FIG. 1.

Generated views on business processes can include blocks, or reusable process fragments, derived from a process model. The terms "block" and "process fragment" may be used interchangeably as appropriate without departing from the scope of this disclosure. FIG. 2 below illustrates an example business process and possible blocks that may be derived from the example process model. Based on standards for business process modeling, certain algorithms can detect blocks in process models, such as business process models based on business process modeling notation (BPMN). BPMN process models are graph-oriented, but some algorithms can be used for identifying blocks within the process model. BPMN process models can include blocks, which provide the ability to comprehend, drill down, or collapse features within a process model, such as to navigate between different process granularities. In some instances, custom views with different granularities for different end user roles can be provided in BPMN-based process models. The automatically detected blocks identified by algorithms associated with such process models, however, do not necessarily relate to semantically coherent process fragments. For example, the algorithms may primarily rely on "single entry, single exit" criterion with respect to control flow sequence connectors, and there may not be consideration of other business process metadata to derive semantically coherent blocks. Further, there may be no relationship among the derived blocks, user role, or organizational hierarchy level associated with the user when certain algorithms are used to determine the appropriate blocks for a user.

In some implementations, the existing approaches and algorithms are enriched such that graph-oriented process models (e.g., BPMN) can be transformed into block-oriented process models with automatic block detection. The existing algorithms may originally be used to perform syntactical checks that enforce well-formed BPMN processes or to translate BPMN-based process models into a BPEL-based execution format. Accordingly, existing algorithms can be complemented to map graph-structured process models to block-structured processes. The algorithms compute a hierarchy of nested blocks which serve as a baseline for finding a suitable process view, with granularity and selection of blocks that are appropriate for a particular user role. A greedy heuristic algorithm can be provided to find semantically coherent blocks or process fragments based on various existing process metadata. Other heuristics, such as genetic algorithms, simulated annealing, or steepest descent can also be used. Custom views onto a process model that are suited for a specific end user can be provided. The custom view can be aligned to the user's functional role and organizational hierarchy level. For different user roles, different process metadata can be consulted to find a custom process view for each specific user. A custom process view is a complete, non-overlapping representation of the process comprising interconnected blocks, or subflows of (1) custom granularity and (2) where the block boundaries are chosen to let a block represent a semantically coherent piece of functionality.

In some instances, the views are automatically generated without requiring manual intervention by leveraging existing process metadata. Blocks within semantically related process fragments are automatically identified such that custom process views can make use of structuring mechanisms of the underlying process language meta-model, such as embedded and referenced sub-processes. Accordingly, a user's functional role is identified to automatically determine components or modules of the business process model that the user would likely need to view to perform the tasks required by the user's role. Certain factors associated with the user's role can be identified from a lookup table, for example, and included in a calculation for determining the appropriate blocks to present to the user based on the user's role. In some implementations, the determination of which blocks to include in the business process model view provided to the user includes calculating a score based on the metadata categories, and weight associated with each metadata category, found in the lookup table that are associated with the user's role. The score is computed from some "fitness values" that assess how well a certain block fits those criteria. For instance, BPM experts should be presented with blocks that comprise an entire conversation (messages exchanges with another business process). If certain message exchanges of that conversation are missing from the block, or if the block contains other process steps that do not partake in the conversation, the fitness value is below 100%. The exact formula to compute a fitness value depends on the metadata category. The overall score is a weighted average of the fitness values from the metadata categories that are chosen for the user's role.

Turning to the illustrated example, FIG. 1 illustrates an example environment 100 for providing automatic identification of semantically coherent, user-aligned fragments in business process models. The illustrated environment 100 includes or is communicably coupled with one or more clients 150 and servers 102, 104, and 106, at least some of which communicate across network 112. In general, environment 100 depicts an example configuration of a system capable of automatically identifying semantically coherent blocks within a business process model for presentation in a particular view for a user based on the user's role within a business organization. In some implementations, the block identification module 104 for determining different views for different users can be implemented as a hosted application on a server, such as server 102, accessible to a user at client 150 through a network 112. Further, the block identification module 104 and other services provided by server 102 can be distributed across multiple servers, such as servers 104 and 106, in a distributed cluster-based environment, for example. In a distributed cluster-based environment, one or more additional servers (e.g., servers 104 and 106) can be included in environment 100, each server having components similar to those depicted in FIG. 1 for server 102 and providing services associated with distributed applications hosted by the servers in the distributed cluster-based environment. In certain instances, client 150 and servers 102, 104, and 106 can be logically grouped within a cloud computing network. Accordingly, the system may be provided as an on-demand solution through the cloud computing network as well as a traditional server-client system or a local application at client 150. Alternatively, the block identification module 176 may be provided through a traditional server-client implementation or locally at client 150 without the need for accessing a hosted application through network 112.

In general, server 102 is any server that stores one or more business process applications 172, where at least a portion of the hosted applications are executed via requests and responses sent to users or clients within and communicably coupled to the illustrated environment 100 of FIG. 1. For example, server 102 may be a Java Platform, Enterprise Edition (JEE)-compliant application server that includes Java technologies such as Enterprise JavaBeans (EJB), JEE Connector Architecture (JCA), Java Messaging Service (JMS), Java Naming and Directory Interface (JNDI), and Java Database Connectivity (JDBC). In some instances, the server 102 may store a plurality of various business process applications 172, while in other instances, the server 102 may be a dedicated server meant to store and execute only a single business process application 172. In some instances, the server 102 may comprise a web server or be communicably coupled with a web server, where the business process applications 172 represent one or more web-based applications accessed and executed via network 112 by clients 150 of the system to perform the programmed tasks or operations of the business process application 172.

At a high level, the server 102 comprises an electronic computing device operable to receive, transmit, process, store, or manage data and information associated with the environment 100. The server 102 illustrated in FIG. 1 can be responsible for receiving application requests from one or more client applications or business applications associated with clients 150 of environment 100, responding to the received requests by processing said requests in the associated business process application 172, and sending the appropriate response from the business process application 172 back to the requesting client application. The server 102 may also receive requests and respond to requests from other components on network 112. Alternatively, the business process application 172 at server 102 can be capable of processing and responding to requests from a user locally accessing server 102. Accordingly, in addition to requests from the external clients 150 illustrated in FIG. 1, requests associated with the hosted applications 172 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server 102, environment 100 can be implemented using one or more servers such as servers 104 and 106, as well as computers other than servers, including a server pool. Indeed, server 102 and client 150 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 and client 150 may be adapted to execute any operating system, including Linux, UNIX, Windows, Mac OS, or any other suitable operating system.

In the present implementation, and as shown in FIG. 1, the server 102 includes a processor 168, an interface 165, a memory 161, and one or more business process applications 172. The interface 165 is used by the server 102 for communicating with other systems in a client-server or other distributed environment (including within environment 100) connected to the network 112 (e.g., clients 150, as well as other systems communicably coupled to the network 112). Generally, the interface 165 comprises logic encoded in software and/or hardware in a suitable combination and operable to communicate with the network 112. More specifically, the interface 165 may comprise software supporting one or more communication protocols associated with communications such that the network 112 or interface's hardware is operable to communicate physical signals within and outside of the illustrated environment 100.

In some implementations, server 102 may include a user interface, such as a graphical user interface (GUI). The GUI comprises a graphical user interface operable to, for example, allow the user of the server 102 to interface with at least a portion of the platform for any suitable purpose, such as creating, preparing, requesting, or analyzing data, as well as viewing and accessing source documents associated with business transactions. Generally, the GUI provides the particular user with an efficient and user-friendly presentation of business data provided by or communicated within the system. The GUI may comprise a plurality of customizable frames or views having interactive fields, pull-down lists, and buttons operated by the user. For example, GUI may provide interactive elements that allow a user to select from a list of suggested entries for input into a data field displayed in GUI. More generally, GUI may also provide general interactive elements that allow a user to access and utilize various services and functions of application 172. The GUI is often configurable, supports a combination of tables and graphs (bar, line, pie, status dials, etc.), and is able to build real-time portals, where tabs are delineated by key characteristics (e.g. site or micro-site). Therefore, the GUI contemplates any suitable graphical user interface, such as a combination of a generic web browser and command line interface (CLI) that processes information in the platform and efficiently presents the results to the user visually.

Generally, example server 102 may be communicably coupled with a network 112 that facilitates wireless or wireline communications between the components of the environment 100 (i.e., between the server 102 and clients 150), as well as with any other local or remote computer, such as additional clients, servers, or other devices communicably coupled to network 112 but not illustrated in FIG. 1. In the illustrated environment, the network 112 is depicted as a single network in FIG. 1, but may be a continuous or discontinuous network without departing from the scope of this disclosure, so long as at least a portion of the network 112 may facilitate communications between senders and recipients.

Network 112 may be all or a portion of an enterprise or secured network, while in another instance at least a portion of the network 112 may represent a connection to the Internet. In some instances, a portion of the network 112 may be a virtual private network (VPN), such as, for example, the connection between client 150 and server 102. Further, all or a portion of network 112 can comprise either a wireline or wireless link. Example wireless links may include 802.11a/b/g/n, 802.20, WiMax, and/or any other appropriate wireless link. In other words, network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. Network 112 may also include one or more local area networks (LANs), radio access networks (RANs), metropolitan area networks (MANs), wide area networks (WANs), all or a portion of the Internet, and/or any other communication system or systems at one or more locations. Network 112, however, is not a required component of the present disclosure, and the elements hosted by server 102, such as the block identification module 176, may be implemented locally at a client 150 or locally at server 102.

Client(s) 150 may have access to resources such as server 102 within network 112. In certain implementations, the servers within the network 112, including server 102 in some instances, may comprise a cloud computing platform for providing cloud-based services. The terms "cloud," "cloud computing," and "cloud-based" may be used interchangeably as appropriate without departing from the scope of this disclosure. Cloud-based services can be hosted services that are provided by servers such as 102, 104, and 106 and delivered across a network to a client platform to enhance, supplement, or replace applications executed locally on a client computer. Clients 150 can use cloud-based services to quickly receive software upgrades, applications, and other resources that would otherwise require a lengthy period of time before the resources can be delivered to clients 150. Additionally, other devices may also have access to cloud-based services, such as on-demand services provided by servers accessible through network 112. A cloud platform deployment implementation, however, is not a required element of the present disclosure, and other distributed infrastructures such as cluster-based systems can also be used.

As illustrated in FIG. 1, server 102 includes a processor 168. Although illustrated as a single processor 168 in FIG. 1, two or more processors may be used according to particular needs, desires, or particular embodiments of environment 100. Each processor 168 may be a central processing unit (CPU), a blade, an application specific integrated circuit (ASIC), a field-programmable gate array (FPGA), or another suitable component. Generally, processor 168 executes instructions and manipulates data to perform the operations of server 102 and, specifically, the one or more plurality of business process applications 172. Specifically, the server's processor 168 executes the functionality required to receive and respond to requests from client system 150 and respective client applications 154 or other servers 104 and 106 in environment 100, as well as the functionality required to perform the other operations of the business process application 172.

Regardless of the particular implementation, "software" may include computer-readable instructions, firmware, wired or programmed hardware, or any combination thereof on a tangible, non-transitory, medium operable when executed to perform at least the processes and operations described herein. Indeed, each software component may be fully or partially written or described in any appropriate computer language including C, C++, Java, Visual Basic, assembler, Perl, any suitable version of 4GL, as well as others. Some software may be associated with BPM notations including BPMN, BPEL, UML state charts, event-driven process chains (EPC), Petri Nets, and the like. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 168 executes one or more business process applications 172 on server 102.

At a high level, each of the one or more business process applications 172 is any application, program, module, process, or other software that may execute, change, delete, generate, or otherwise manage information according to the present disclosure, particularly in response to and in connection with one or more requests received from the illustrated client system 150 and its associated client applications 154 or from other servers or components through a network 112. In certain cases, only one business process application 172 may be located at a particular server 102. In others, a plurality of related and/or unrelated business process applications 172 may be stored at a single node 102, or located across a plurality of other nodes 102, as well. In certain cases, environment 100 may implement a composite business process application 172. For example, portions of the composite application may be implemented as Enterprise Java Beans (EJBs) or design-time components may have the ability to generate run-time implementations into different platforms, such as JEE (Java Platform, Enterprise Edition), ABAP (Advanced Business Application Programming) objects, or Microsoft's .NET, among others.

Additionally, one or more of the business process applications 172 may represent web-based applications accessed and executed by remote system 150 or client applications 154 via the network 112 (e.g., through the Internet). Further, while illustrated as internal to server 102, one or more processes associated with a particular business process application 172 may be stored, referenced, or executed remotely. For example, a portion of a particular business process application 172 may be a web service associated with the application that is remotely called, while another portion of the business process application 172 may be an interface object or agent bundled for processing at a client system 150. Moreover, any or all of the business process applications 172 may be a child or sub-module of another software module or enterprise application (not illustrated) without departing from the scope of this disclosure. Still further, portions of the business process application 172 may be executed by a user working directly at server 102, as well as remotely at client system 150.

As illustrated, server 102 can also include a business process management (BPM) runtime 174 that provides services, libraries, and tools for executing business process applications. The BPM runtime 174 can also handle any state changes to business processes, including state changes associated with execution of process steps based on received events. Server 102 includes a block detection module 178 that detects blocks using existing algorithms. Server 102 can also execute a block identification module 176 that provides automatic identification of semantically coherent blocks of a business process model in order to present a business process view to a user that is aligned with the user's role and identification. In some implementations, the block identification module 176 can be executed by a different processor or server external to server 102, such as by a server communicably coupled to server 102 through network 112. For example, the block identification module 176 may be provided as an on-demand service through a cloud computing network, as a web service accessible via network 112, as a service provided on a dedicated server, or as an application in a cluster-based distributed network.

The block identification module 176 can provide interfaces, modules, services, or metadata definitions that enable a client application 154, for example, to present a particular view of a business process model with semantically coherent blocks that are relevant to a particular user of client application 154 based on the user's role or other context data associated with the user. In the present disclosure, a business process may be any directed graph of process steps such as activities, tasks, events, gateways, or sequential steps performed in association with a particular business context, business partner, or customer. Business processes may be performed in software as a computer program and/or in connection with a computer microprocessor, server, workstation, instance of a computer program, thread of execution within a computer program, or other data processing element. Further, as used in the present disclosure, block identification module 176 may be separate from business process application 172, while in other instances, the block identification module 176 may be embedded within or part of business process application 172 or one or more other hosted applications.

In general, server 102 also includes memory 161 for storing data and program instructions. Memory 161 may include any memory or database module and may take the form of volatile or non-volatile memory including, without limitation, magnetic media, optical media, random access memory (RAM), read-only memory (ROM), removable media, or any other suitable local or remote memory component. Memory 161 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of server 102 and its one or more business process applications 172.

Memory 161 may also store data objects such as business process models 164 used by the block identification module 176. For example, a particular process model 164 may include process model definitions and parameters associated with a particular business process. The process models 164 may be retrieved from memory 161 when the block identification module 176 is identifying process model blocks to present as a particular view on a process model for a user based on the user's role. Memory 161 may also store information associated with process instances 165. The process instances 165 may be retrieved by a runtime environment during modification of a business process. A process instance can consist of variables that hold the status of a particular process. The variables capture the progress of control and data flows using elements such as instruction pointers and variables holding instances of business documents that were manipulated during execution of the process. Memory 161 can also store other business process metadata 166 used to identify a particular context of a user in order to determine appropriate blocks and information to present to the user in a view of a process model. For example, the business process metadata 166 can be grouped into categories as described below with respect to FIG. 3. Some metadata categories can be more relevant to certain user roles, and blocks are identified accordingly for a particular user based on the metadata categories relevant to the user's role. Accordingly, the business process metadata 166 can be leveraged to determine blocks of semantically related process fragments to automatically generate views aligned to a user's role without requiring manual intervention in some instances.

The illustrated environment of FIG. 1 also includes one or more clients 150. Each client 150 may be any computing device operable to connect to or communicate with at least the server 102 and/or via the network 112 using a wireline or wireless connection. In some implementations, as illustrated in FIG. 1, client 150 can also include a processor 156, an interface 155, a graphical user interface (GUI) 152, a client application 154, and a memory 158. In general, client 150 comprises an electronic computer device operable to receive, transmit, process, and store any appropriate data associated with the environment 100 of FIG. 1. It will be understood that there may be any number of clients 150 associated with, or external to, environment 100. For example, while illustrated environment 100 includes one client 150, alternative implementations of environment 100 may include multiple clients communicably coupled to the server 102, or any other number of clients suitable to the purposes of the environment 100. Additionally, there may also be one or more additional clients 150 external to the illustrated portion of environment 100 that are capable of interacting with the environment 100 via the network 112. Further, the term "client" and "user" may be used interchangeably as appropriate without departing from the scope of this disclosure. Moreover, while each client 150 is described in terms of being used by a single user, this disclosure contemplates that many users may use one computer, or that one user may use multiple computers.

The GUI 152 associated with client 150 comprises a graphical user interface operable to, for example, allow the user of client 150 to interface with at least a portion of the platform for any suitable purpose, such as creating, preparing, requesting, or analyzing data, as well as viewing and accessing source documents associated with business transactions. Generally, the GUI 152 provides the particular user with an efficient and user-friendly presentation of business data provided by or communicated within the system. The GUI 152 may comprise a plurality of customizable frames or views having interactive fields, pull-down lists, and buttons operated by the user. For example, GUI 152 may provide interactive elements that allow a user to enter, modify, select, or model elements of business process instances in GUI 152. A view of a process model based on the user's role within a business organization may be presented and accessible to the user through GUI 152, such as through a web browser, for example. The business process steps, interdependencies and modification options may be graphically rendered and presented in GUI 152 to allow a user to contribute to or view a business process modeling task. More generally, GUI 152 may also provide general interactive elements that allow a user to access and utilize various services and functions of application 154. The GUI 152 is often configurable, supports a combination of tables and graphs (bar, line, pie, status dials, etc.), and is able to build real-time portals, where tabs are delineated by key characteristics (e.g. site or micro-site). Therefore, the GUI 152 contemplates any suitable graphical user interface, such as a combination of a generic web browser, intelligent engine, and command line interface (CLI) that processes information in the platform and efficiently presents the results to the user visually.

As used in this disclosure, client 150 is intended to encompass a personal computer, touch screen terminal, workstation, network computer, kiosk, wireless data port, smart phone, personal data assistant (PDA), one or more processors within these or other devices, or any other suitable processing device. For example, each client 150 may comprise a computer that includes an input device, such as a keypad, touch screen, mouse, or other device that can accept user information, and an output device that conveys information associated with the operation of the server 102 (and business process application 172) or the client 150 itself, including digital data, visual information, client application 154, or GUI 152. Both the input and output device may include fixed or removable storage media such as a magnetic storage media, CD-ROM, or other suitable media to both receive input from and provide output to users of client 150 through the display, namely, GUI 152.

While FIG. 1 is described as containing or being associated with a plurality of elements, not all elements illustrated within environment 100 of FIG. 1 may be utilized in each alternative implementation of the present disclosure. For example, although FIG. 1 depicts a distributed cluster-based environment implementing a hosted application at servers 102, 104, and 106 that can be accessed by client computer 150, in some implementations, server 102 executes a local application that features an application UI accessible to a user directly utilizing GUI 152. Further, although FIG. 1 depicts a server 102 external to network 112, servers may be included within the network 112 as part of a cloud network solution, for example. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

FIG. 2 illustrates an example diagram of a business process 200 and identified blocks associated with the business process 200. As depicted in FIG. 2, a business process 200 can include a control flow comprised of numerous steps or elements. Existing algorithms can be used to determine the blocks comprising the business process 200, including which elements are included in each block. As seen in FIG. 2, the business process 200 can be divided into three different blocks, block 202, block 204, and block 206. Each of the three blocks can include a distinct, non-overlapping portion of the business process 200 having different process steps within each block. Although FIG. 2 illustrates a business process 200 with three blocks explicitly identified, fewer or more blocks can be identified for business process 200. For example, the entire business process 200 can comprise a single, overall block, or business process 200 could be divided into two separate blocks (instead of three blocks as depicted in FIG. 2). Further, business process 200 can be associated with additional layers of blocks, such as nested blocks. For example, a particular step within business process 200 can be associated with a subflow 208. In some instances, subflow 208 can be a separate, nested block within block 206. Further, business process 200 can also be divided into blocks along different boundaries.

In certain implementations, the blocks included in a view for presentation to the user can comply with a set of criteria. For example, a view generated for a user may be required to be complete in that all the process artifacts for a business process are present in the view. In other words, the business process is covered from end to end in a particular view and no process artifacts are omitted, even though some artifacts may not be expanded in full detail in the view. A second criterion for generating views can be that the blocks included in the view are disjointed. A characteristic of disjointed blocks is that certain artifacts are prohibited from being contained in two or more different blocks. Disjointed blocks can include nested blocks, however, such as when a particular block also includes a subflow 208 represented as a nested block.

In some implementations, another criterion that can be used when generating views is that the view is optimized for a particular user role. Users in different roles within a business organization may be interested in different views of a business process model, with different views possibly containing different arrangements of blocks to present to the user. For example, an IT expert may be interested in how to automate a business process most efficiently and how to configure the business process to map to an existing IT landscape. A BPM expert may be interested in ways to optimize the business process, an LoB manager may try to understand the potential costs incurred, and C-level management may try to understand the intent of certain procedures and processes. In any event, users in each of the different roles may be interested in different data or a different level of granularity of the process model. Accordingly, the views presented to users having different roles can be adjusted to align with the needs, role, and skill set of the particular user receiving the view.

Figure 3:
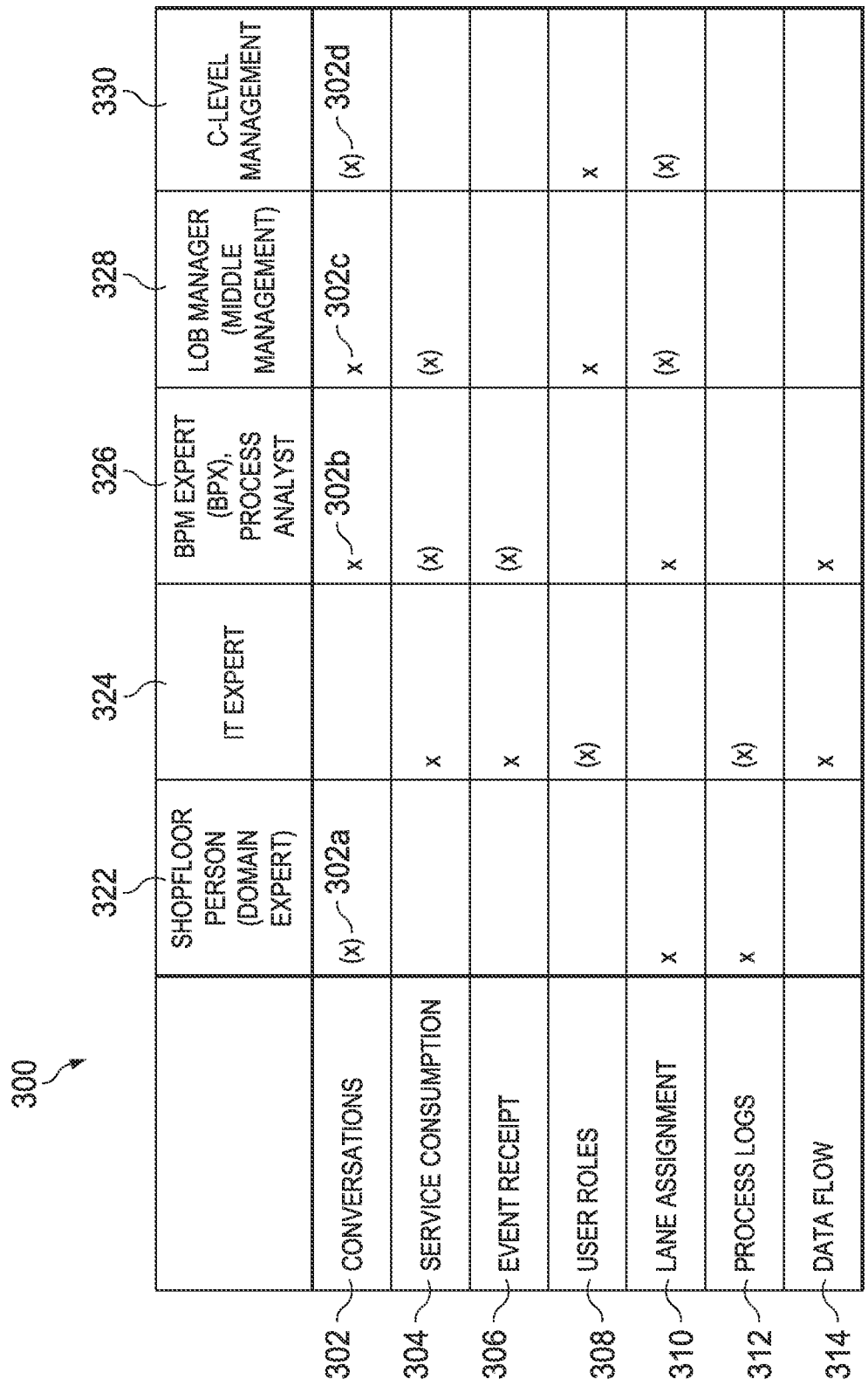
FIG. 3 is a chart of example business process metadata categories for certain user roles.

FIG. 3 illustrates a chart 300 of example user roles within a business organization and example process metadata categories, artifacts, topics, or grouping of items that may be of interest to each of the user roles. In some implementations, the metadata categories can be derived from the BPMN process modeling language, as depicted in FIG. 3, but metadata categories can also be derived from other sources. The chart 300 may be in the form of a lookup table to allow efficient identification of a user's role and the groupings that may be of interest to the user so that an appropriate block or set of blocks can be included in a view for the user. A business process model can be divided into blocks, as illustrated in FIG. 2, with different combinations of blocks providing different levels of granularity with respect to the business process. A particular combination of blocks can then be presented to a user as a particular view on a business process, with each view aligned to a user's role within the business organization and including the process model blocks that are most likely to be of interest to the user. The determination of which blocks to present to a particular user can be initiated by identifying metadata categories that users having a particular role would most likely be interested in. In some instances, a user's role is identified and potential metadata categories for users within the role can be identified from a lookup table, such as represented in the chart in FIG. 3. Although FIG. 3 illustrates several example metadata categories which may be of potential interest to users, the lookup table can be dynamic and additional user roles (columns) or business process categories (rows) can be added to the lookup table depending on the situation and on what process metadata is available. Metadata categories that can be used to generate user-aligned views are not limited to the categories shown in FIG. 3 and do not necessarily include each of the categories shown. Further, lookup table 300 can be manually defined or automatically defined based on user roles, actions, and other factors as appropriate.

As seen in FIG. 3, one of the metadata categories of interest to users with certain roles can include conversations. Conversations can be groupings of inbound and outbound messages that belong to a logically coherent interchange of messages that serve one or more common goals. Conversation boundaries can be used to define semantically coherent process fragments or blocks. For example, BPMN representations of business processes can group a set of related messages into a conversation artifact.

Multiple messages to and from the same business partner, system, or process can be grouped into conversation entities. In some instances, blocks can be defined with different levels of granularity with respect to conversation entities, such as a single conversation included in one block, all conversations belonging to the same business partner, or any other appropriate grouping of conversation entities within a block.

Some users associated with certain roles may be interested in a view that enables a user to see a block that contains the message exchanges for a particular conversation. As indicated in FIG. 3 by marks 302b and 302c, users associated with BPM expert 326, process analyst 326, or LoB manager roles 328, for example, may be interested in messages grouped into particular conversations. An IT expert 324, however, may not be interested in how the messages are grouped together and may, instead, be more interested in individual messages or consumption of services. Accordingly, a view generated for the IT expert 324 may not be based on providing conversation artifacts to the IT expert 324. In certain instances, users associated with shop floor 322 or C-level management 330 roles may have some interest in conversations, as indicated by marks 302a and 302d in parentheses.

In other words, the likelihood of a shop floor user 322 or C-level management user 330 having an interest in conversations may be less than a BPM expert 326 but more than an IT expert 324, for example. That likelihood is reflected in the fitness value's weighting for this metadata category when computing a score for the block. For instance, the weight of this category ("conversations") may be 1.0 for BPM experts and LoB managers and 0.5 for shop floor people and C-managers (other weighting factors are, of course, conceivable). The lookup table 300 suggests a range of appropriate weightings. In addition, marks 302a and 302d may indicate that the potential interest that a shop floor user 322 or C-level management user 330 has in conversation artifacts is unknown at the time and may depend on the particular context in which a view is generated. In some implementations, variables, multipliers, percentages, or other values may be used in the lookup table 300 in place of "x" marks to represent a relative likelihood that a user with a particular role has an interest in a particular artifact. The values can then be used to generate a score for each of different possible views and combinations of blocks to present to a user associated with a particular role.

An example calculation of the score can include identifying all metadata categories that apply to the current user role. For all identified metadata categories, a "fitness value" for the block under consideration is computed. In some instances, the algorithm to compute a fitness value is specific to a metadata category. The algorithm takes the current block and optionally the user role as input and returns a value in the range of 0 to 1, where 0 represents the "worst fit" and 1 represents the "best fit." The overall block score is computed as a weighted average of all fitness values where the weights can be identified in lookup table 300. In the illustrated example, an "X" may represent a weight of 1 and a "(X)" may represent a weight of 0.5. Other variants of table 300 may give more precise weights in the range between 0 and 1. For n selected metadata categories, $F_i$ being the fitness value of metadata category i and $W_i$ being its weight, the score can be calculated as follows:

$$Score=(1/n)\times(F_1\times W_1+F_2\times W_2+\ldots +F_n\times W_n)$$

Figure 4:
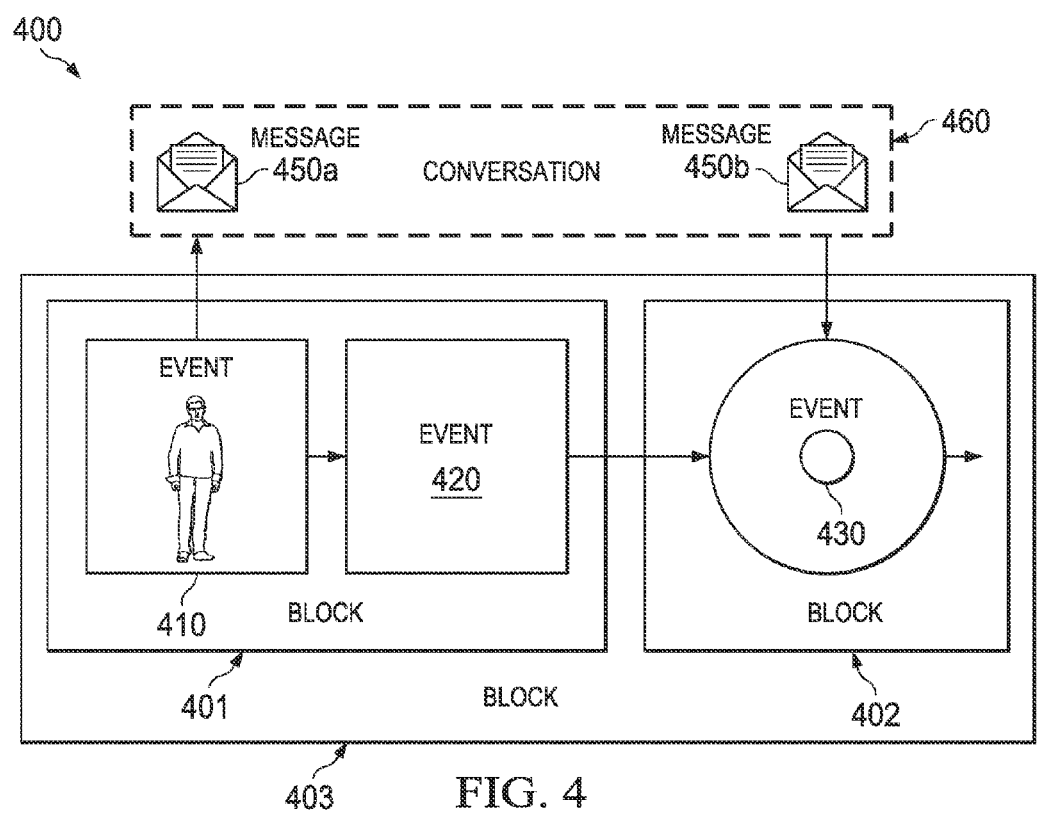
FIG. 4 is a diagram illustrating identification of process fragments in view of conversation metadata using an appropriate system, such as the system described in FIG. 1.

FIG. 4 illustrates an example scenario 400 of possible blocks identified for inclusion in views of a business process based on whether a particular user role requires viewing of a conversation. As depicted in FIG. 4, a business process can include event 410 and continue through events 420 and 430, for example. In the illustrated example, a message is transmitted at event 410. At an intermediate message event 430, message 450b can be received by an entity associated with the business process. Messages 450a and 450b may, in the present example, be part of the same conversation 460. In some instances, blocks can be identified to include one or more events in the business process depending on the needs of the users that require a particular view of the business process. For example, block 401 could be defined such that events 410 and 420 are included in block 401, while block 402 can be defined to include event 430 and possibly other events.

A view that includes blocks 401 and 402 as separate blocks, however, would not provide a view of conversation 460 with both messages 450a and 450b within the same block. In some instances, a user may not need a view of the entire conversation 460. For example, based on a lookup table of user roles and artifacts of interest, such as depicted in FIG. 3, an IT expert may not need to view entire conversations with groupings of messages because the IT expert may not be interested in how a process communicates with other processes. As seen in the lookup table in FIG. 3, however, a BPM expert may have an interest in viewing an entire conversation 460 with messages 450a and 450b because the BPM expert may need to optimize interactions of a business process with other systems or business processes. Accordingly, the BPM expert may prefer to have all messages within conversation 460 (messages 450a and 450b) belonging to the same block(s) in the particular process model view that is served to the BPM expert. In the illustrated example, block 403 can be defined such that it is aligned to the BPM expert's requirements for viewing conversation 460. As seen in FIG. 4, block 403 includes events 410, 420, and 430 which encompass both message 450a and message 450b. Accordingly, block 403 may be suitable to include in a view for a BPM expert because it provides a view that includes both messages in conversation 460.

Returning to the example illustrated in FIG. 3, other artifacts and groupings may be considered when generating views from process model blocks. For example, service consumption 304 groupings can be used to group the consumption of services in an enterprise resource planning (ERP) system into certain categories. Consumed services can include public web services, enterprise services, business application programming interfaces (BAPI), or business objects. In some instances, technical groupings for public web services can be based on the namespace of a service interface, the domain and physical service provider system, common data types in the service signature, or other technical service characteristics, such as security settings or whether the protocol of the service is SOAP (Simple Object Access Protocol) or REST (Representational State Transfer) based. Specific categories for grouping enterprise services can include, for example, solution maps (e.g., "High Tech—Business, Medical, and Consumer OEMs"), business scenario maps (e.g., "High Tech: DRM Agreement Negotiation"), process categories (e.g., "Product Management"), business processes (e.g., "Product Strategy and Planning"), or process components (e.g., "Business Document Flow Processing").

In certain instances, a user may not need to view a grouping of different services in one block. Enterprise services, such as creating purchase orders or booking leave requests, can be distinct and heterogeneous services, and a shop floor user 322, for example, would consider the services as disconnected for purposes of performing the shop floor user's tasks. Similarly, C-level management 330 users may have no need for the technical information associated with service consumption 304. From the perspective of an IT expert 324, however, service consumption 304 groupings may be important because the IT expert 324 would benefit from viewing the portion of the business processes that are interacting with a particular system when the IT expert 324 configures the services for invocation or consumption, or when the IT expert rectifies connection problems to the system.

As seen in FIG. 3, event receipt 306 is another possible metadata category that can be used to determine appropriate blocks to include in a particular view for a user. In some situations, events can be grouped based on whether the events originate from the same technical system, business process, or business object, for example. For instance, a view generated for a process analyst can include a process fragment that receives events or interacts exclusively with a particular business process. Views can also be generated with respect to user roles 308 and relationships to organizational hierarchy levels, such as whether an event is associated with process/task administrators, potential or excluded owners of certain user tasks, or notification recipients. User role 308 relationships can be beneficial for determining task processing and viewing which process steps are assigned to certain user roles. Users associated with people management roles, such as LoB managers 328 and C-level management 330, may be interested in user role 308 relationships to determine the tasks associated with different users under a manager's direction.

In some implementations, the identification of blocks to be included in a view can be defined in part by considering lane assignments 310 within a business process. A control flow associated with a business process can enter into or exit out of different functional units in a business process. A functional unit can, for example, be any structural or logical unit within a business organization such as a department, a specific user role, or a specific person. In a business process model, the steps, activities, and data flows associated with each functional unit or role can be represented as a different "lane" in the business process model, and as the control flow moves from one functional unit to a different functional unit, the data flow enters and exits the different lanes associated with each functional unit. In some instances, lanes can be assigned to a specific user role, such as a user who performs the tasks associated with a particular lane. Accordingly, a view generated for a user associated with a particular lane may include a block containing all activities within that lane. If the business process branches off to a different lane without re-entering the lane associated with the user, the portion of the business process in the different lane could be represented in a separate block and details regarding the separate block may not be presented to the user in an expanded view.

Semantically coherent process fragments or blocks can also be derived from process logs 312. Process logs can include data collected or recorded from previous business process runs. Examples of historical data collected in process logs can include statistical data regarding the most frequently executed process branches, actual processors of human tasks, or turnaround times for single process activities and latencies between neighboring activities. The historical data from process logs can then be used to derive semantically coherent process fragments. For example, blocks can be defined such that they are exclusively composed of model elements from the most frequently executed process branches or the tasks which are completed by a single person. As illustrated in FIG. 3, generating views of a business process model can also depend at least in part on data flows 314. Identifying blocks based on data flows 314 can, in certain instances, involve grouping entities based on the data objects they access. Semantically coherent blocks can be identified by reading from or writing to certain elements of a business process context, such as the modeled set of data objects forming the process state. As depicted in FIG. 3, users associated with different roles may differ in potential interest in views having blocks defined based on process logs 312 or data flows 314.

Figure 5:
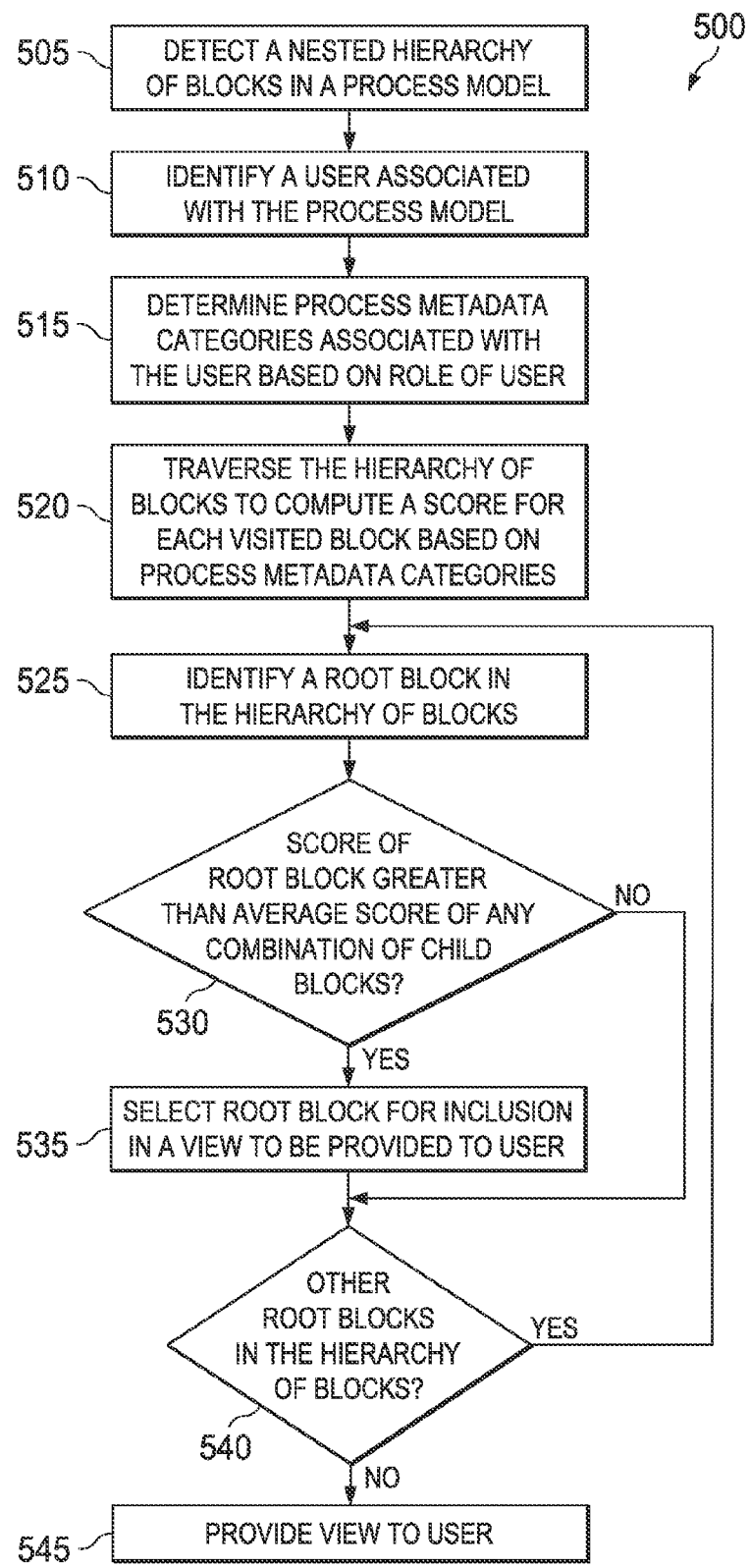
FIG. 5 is a flowchart of an example process for providing user-aligned process fragments in a view of a business process model using an appropriate system, such as the system described in FIG. 1.

FIG. 5 illustrates an example process 500 for providing a view of a process model customized for a user based on the user's role. A nested hierarchy of blocks in a process model is detected at 505. Certain block detection algorithms can be used to compute a hierarchy of nested blocks which serve as a baseline for finding a suitable process view appropriate for a user role. In some instances, the automatic block detection algorithms in non-block structured process models, such as BPMN process models, can rely on "single entry, single exit" criterion with respect to control flow sequence connectors to identify a hierarchy of blocks. A user associated with the process model is then identified at 510. The identified user can be any user that may need access to a particular view of a business process model, such as a contributor to the modeling process or a user who needs to view the process model for certain tasks. Depending on the role of the user, the user may be more interested in certain portions, layers, or levels of detail associated with the process model. The algorithms used to automatically detect blocks within the process model, however, may not utilize process metadata to derive semantically coherent blocks that are aligned with the user's role or organizational hierarchy level. Accordingly, process metadata categories associated with the user are determined based on the role of the user at 515. In some instances, the role of the user can be determined through a company's org chart, and the process metadata associated with the user role can be identified through a lookup table, as shown in FIG. 3.

As described above in relation to FIG. 3, process metadata categories are categories of metadata associated with business processes that may be of interest to users having a particular role within a business organization. The metadata categories can be derived from process modeling languages such as BPMN and can be used to find custom process views for users. Users having a certain role may be interested in viewing data contained in certain categories while users in other roles may be interested in other metadata categories. Examples of process metadata categories are described above in connection with FIG. 3. The likelihood that a user associated with a particular user role is interested in each of the process metadata categories can be used to determine blocks containing information with a suitable amount of detail appropriate for the user. In other words, suitable process metadata is identified to determine semantically coherent process fragments for the user based on the user's level in the org chart (e.g., shop floor user, LoB manager, etc.) and the user's functional role or profession (e.g., IT expert, process analyst, domain expert, business expert, etc.)

The hierarchy of blocks is traversed to compute a score for each visited block based on the process metadata categories at 520. The hierarchy of blocks, as determined at 505, can consist of root blocks and child blocks. A hierarchy is a tree structure having a single root (which is initially the entire process model), inner nodes (which are blocks inside the process) and leaf nodes which are the atomic (non-decomposable) process steps which form the smallest "blocks." A score is computed for each block that reflects the "appropriateness" of the block for a user role associated with the user. In some implementations, the score for each block can be computed by a function associated with each metadata category that generates a value based on contextual information associated with the user, such as functional role or organizational hierarchy level, and metadata attributes. The grouping and granularity rules of a given metadata category are evaluated to determine a level of "appropriateness" of a particular block for a particular user role. If multiple metadata categories contribute to the score of a block, a weighted average normalizes the individual scores of each category into a global score value for the block that can be compared to scores of other blocks.

After the scores have been calculated for the blocks within the hierarchy of blocks, appropriate blocks need to be selected for inclusion in a view provided to the user. A root block is identified at 525. The root block can be a top-level block within the process model. If it is determined that the score of the root block is greater than the average score of any disjointed and complete combination of child blocks in the same sub-tree under the root block at 530, then the root block is selected for inclusion in a view to be provided to the user at 535. If the score of the root block is not greater than the average score of any combination of child blocks, then the root block is not selected for inclusion in the view. The selection process is repeated for other root blocks in the hierarchy of blocks. If there are other root blocks in the hierarchy as determined at 540, the selection process returns to identifying the next root block at 525 and repeating selection of root blocks based on a comparison of the scores generated for each block. If there are no other root blocks in the hierarchy, a view is provided to the user at 545 that includes the blocks selected as being the most "appropriate" for a particular user role and any associated combination of blocks. In addition to, or instead of, checking all possible combinations of blocks and selecting the combination that is the "best" match for the user role, heuristics (such as greedy algorithms, steepest descent, genetic algorithms, simulated annealing, etc.) can be used to save costs by searching for block combinations with desirable features.

Although the selection process described above for identifying appropriate blocks to present to a user involves traversing the hierarchy of blocks and comparing scores of root blocks with scores of combinations of blocks within the same sub-tree, other methods of selecting appropriate blocks for inclusion in a view aligned with user roles are also within the scope of the present disclosure. For example, a particular view can be generated with a particular combination of blocks based, at least in part, on a history of previous views requested or generated by a user. The process can include relevance feedback mechanisms that make a user's preferences with respect to the choice of blocks (e.g., their granularity) a dedicated metadata category that affects the total score upon which the choice is ultimately made. Further, historical data can be collected with respect to a particular user or across a plurality of users. The historical data can then be used to generate future views of a business process model in order to provide a view aligned with the user's likely interest or need. Additional features can also be included in the view provided to the user. For example, certain layers, granularities, or activities within a business process can be automatically "drilled-down" or expanded in a view provided to a user based on the user's role. Similarly, certain details may be rolled up or visually hidden from the user in the view of the business process model based on the user's role.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method performed by one or more processors for providing automatic identification of semantically coherent, user-aligned fragments in business process models, the method comprising the following operations:
   identifying a user interacting with a business process model;
   identifying, by at least one of the one or more processors a hierarchy of process fragments in the business process model associated with the user;
   determining at least one process metadata category associated with a role of the user;
   automatically computing, by at least one of the one or more processors a score for each process fragment in the hierarchy of process fragments, the score computed based at least in part on a probable level of interest in the at least one process metadata category for the role of the user; and
   selecting at least one process fragment in the hierarchy of process fragments for inclusion in a view of the business process model to be presented to the user, the selection based at least in part on the score computed for the at least one process fragment.

2. The method of claim 1, wherein the hierarchy of process fragments is determined by an automatic process fragment detection algorithm.

3. The method of claim 1, wherein computing the score for each process fragment includes computing a weighted average of scores for each process metadata category associated with a particular process fragment.

4. The method of claim 1, wherein selecting the at least one process fragment further comprises:
   identifying a root process fragment in the hierarchy of process fragments; and
   selecting the root process fragment for inclusion in the view of the business process model if a score of the root process fragment is greater than average scores of all combinations of process fragments in a sub-tree associated with the root process fragment.

5. The method of claim 1, wherein selecting the at least one process fragment is further based on a history of the user's previous views of the business process model.

6. The method of claim 1, wherein the at least one process metadata category comprises at least one of conversations, service consumption, event receipts, user roles, lane assignments, process logs, or data flows.

7. The method of claim 1, wherein the view of the business process model contains a complete representation of all process fragments associated with the business process model.

8. The method of claim 1, the probable level of interest in the at least one process metadata category for the role of the user is determined based on analysis of statistical data related to previous views of business process models.

9. The method of claim 1, wherein identifying the user interacting with the business process model comprises identifying the user associated with a request to view with the business process model.

10. A computer program product encoded on a non-transitory, tangible storage medium, the product comprising computer readable instructions for causing one or more processors to perform operations comprising:

identifying a user interacting with a business process model;

identifying, by at least one of the one or more processors, a hierarchy of process fragments in the business process model associated with the user;

determining at least one process metadata category associated with a role of the user;

automatically computing a score for each process fragment in the hierarchy of process fragments, the score computed based at least in part on a probable level of interest in the at least one process metadata category for the role of the user; and selecting at least one process fragment in the hierarchy of process fragments for inclusion in a view of the business process model to be presented to the user, the selection based at least in part on the score computed for the at least one process fragment.

11. The computer program product of claim 10, wherein the role of the user is determined based on an org chart associated with the user.

12. The computer program product of claim 10, wherein computing the score for each process fragment includes computing a weighted average of scores for each process metadata category associated with a particular process fragment.

13. The computer program product of claim 10, wherein selecting the at least one process fragment further comprises:

identifying a root process fragment in the hierarchy of process fragments; and selecting the root process fragment for inclusion in the view of the business process model if a score of the root process fragment is greater than average scores of all combinations of process fragments in a sub-tree associated with the root process fragment.

14. The computer program product of claim 10, wherein selecting the at least one process fragment is further based on a history of the user's previous views of the business process model.

15. The computer program product of claim 10, wherein the view of the business process model contains a complete representation of all process fragments associated with the business process model.

16. The computer program product of claim 10, wherein the probable level of interest in the at least one process metadata category for the role of the user is determined based on analysis of statistical data related to previous views of business process models.

17. The computer program product of claim 10, wherein identifying the user interacting with the business process model comprises identifying the user associated with a request to view with the business process model.

18. A system, comprising:

memory operable to store process metadata; and one or more processors operable to:

identify a user interacting with a business process model;

identify a hierarchy of process fragments in the business process model associated with the user;

determine at least one process metadata category associated with a role of the user;

automatically compute a score for each process fragment in the hierarchy of process fragments, the score computed based at least in part on a probable level of interest in the at least one process metadata category for the role of the user; and select at least one process fragment in the hierarchy of process fragments for inclusion in a view of the business process model to be presented to the user, the selection based at least in part on the score computed for the at least one process fragment.

19. The system of claim 18, wherein computing the score for each process fragment includes computing a weighted average of scores for each process metadata category associated with a particular process fragment.

20. The system of claim 18, wherein selecting the at least one process fragment further comprises:

identifying a root process fragment in the hierarchy of process fragments; and selecting the root process fragment for inclusion in the view of the business process model if a score of the root process fragment is greater than average scores of all combinations of process fragments in a sub-tree associated with the root process fragment.

21. The system of claim 18, wherein selecting the at least one process fragment is further based on a history of the user's previous views of the business process model.

22. The system of claim 18, wherein the view of the business process model contains a complete representation of all process fragments associated with the business process model.

23. The system of claim 18, wherein identifying the user interacting with the business process model comprises identifying the user associated with a request to view with the business process model.

* * * * *